(12) United States Patent
Houck et al.

(10) Patent No.: US 6,173,483 B1
(45) Date of Patent: Jan. 16, 2001

(54) APPARATUS FOR MANUFACTURING DRAINAGE LINE UNITS AND ASSOCIATED METHODS

(75) Inventors: Michael H. Houck; Thomas K. Weaver, both of Brevard, NC (US)

(73) Assignee: E Z Flow L.P., Oakland, TN (US)

( * ) Notice: Under 35 U.S.C. 154(b), the term of this patent shall be extended for 0 days.

(21) Appl. No.: 09/364,314

(22) Filed: Jul. 30, 1999

Related U.S. Application Data

(60) Provisional application No. 60/094,860, filed on Jul. 31, 1998.

(51) Int. Cl.[7] .................................................... B23Q 17/00
(52) U.S. Cl. ........................... 29/407.09; 29/417; 29/429; 29/714; 29/779; 29/820; 53/436; 53/459; 53/469; 53/473
(58) Field of Search ........................... 29/407.01, 407.09, 29/417, 429, 714, 728, 779, 819, 820; 406/10; 198/493; 53/576, 469, 471, 475, 523, 473, 436, 409, 435, 527, 459; 405/43, 45, 46, 47, 48, 49, 50

(56) References Cited

U.S. PATENT DOCUMENTS

| | | | |
|---|---|---|---|
| 2,521,833 | * | 9/1950 | Dahl . |
| 2,540,272 | * | 2/1951 | Malmstrom et al. . |
| 3,732,662 | * | 5/1973 | Paxton . |
| 3,802,337 | * | 4/1974 | St.-Hiliare . |
| 3,815,323 | * | 6/1974 | Longo . |
| 4,044,525 | * | 8/1977 | Forsgren . |
| 4,104,774 | * | 8/1978 | Overmyer et al. . |
| 4,537,006 | * | 8/1985 | Pieri . |
| 4,566,393 | * | 1/1986 | Connell et al. . |
| 4,716,712 | * | 1/1988 | Gill . |
| 4,733,449 | * | 3/1988 | Spearman . |
| 4,793,744 | * | 12/1988 | Montag . |
| 5,535,499 | * | 7/1996 | Houck et al. . |

\* cited by examiner

*Primary Examiner*—David P. Bryant
(74) *Attorney, Agent, or Firm*—David A. Tamburro

(57) ABSTRACT

An apparatus and method for manufacturing a drainage line unit. The apparatus includes a mandrel having an inner cavity. Rear, upper and front openings communicate with the mandrel cavity. Preferably, a controller connected to at least one sensor is operably positioned to control the apparatus. A pipe feeder feeds perforated vent pipe through the inner cavity of the mandrel from the rear opening to the front opening and therethrough. The pipe is positioned within the inner tube cavity so as to define a void space between the pipe and the wall of the mandrel. A hopper assembly has an exit port positioned for feeding a plurality of plastic bodies into the cavity. A blower produces a sufficient air flow through the mandrel cavity for moving the plurality of plastic bodies to substantially fill the void space so that the pipe emerges from the front opening of the mandrel surrounded by the plurality of plastic bodies. A sleeve feeder feeds a continuous sleeve of netting over the plurality of plastic bodies and the vent pipe emerging through the front opening of the mandrel to form a drainage line. A separator is positioned downstream from the front opening for fastening the continuous sleeve of netting to the vent pipe as the pipe emerges through the front opening of the mandrel, so as to substantially encase the plurality of plastic bodies around the vent pipe. Following the fastening operation, the separator cuts the drainage line, thereby forming a completed drainage line unit.

48 Claims, 7 Drawing Sheets

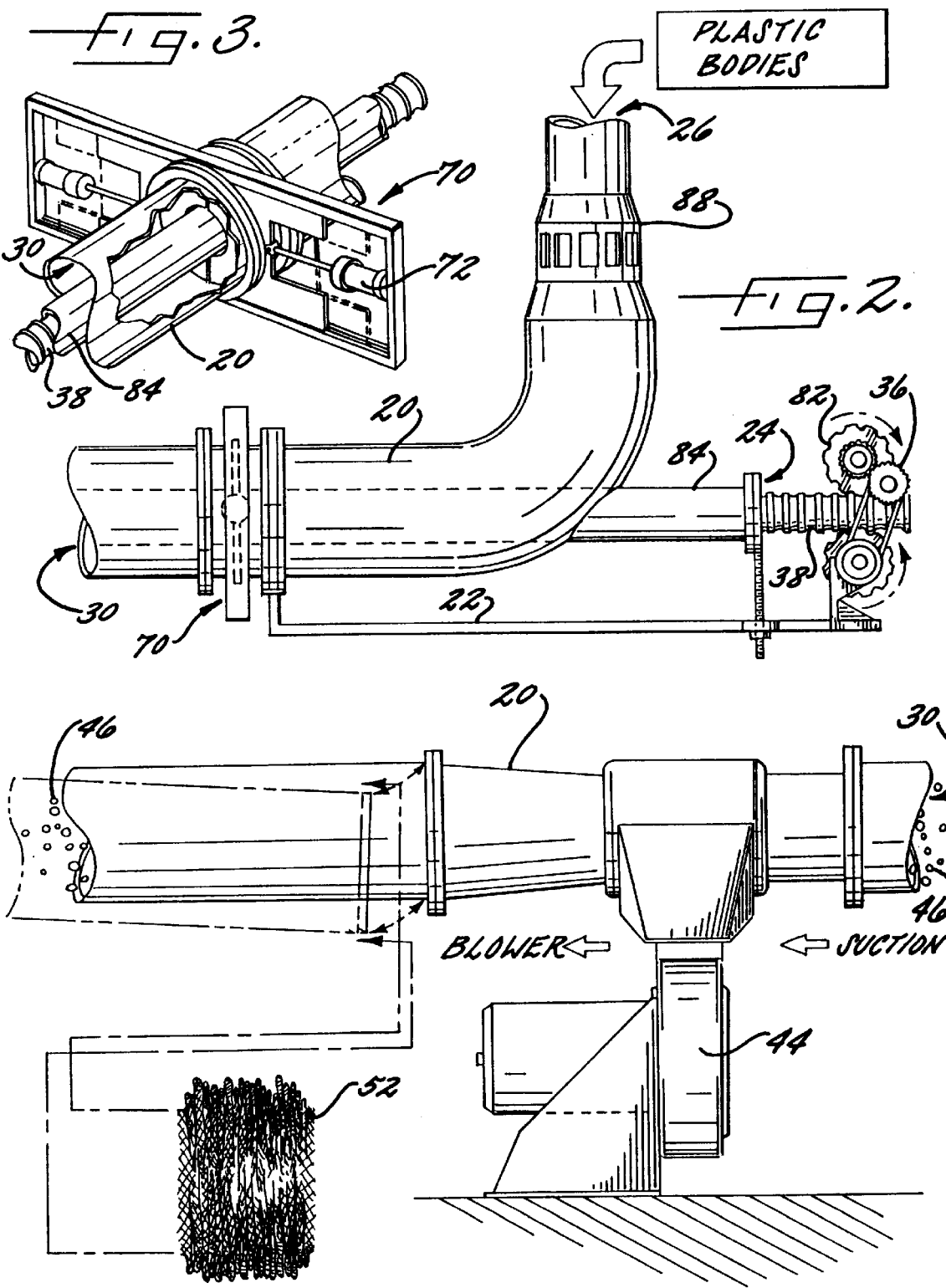

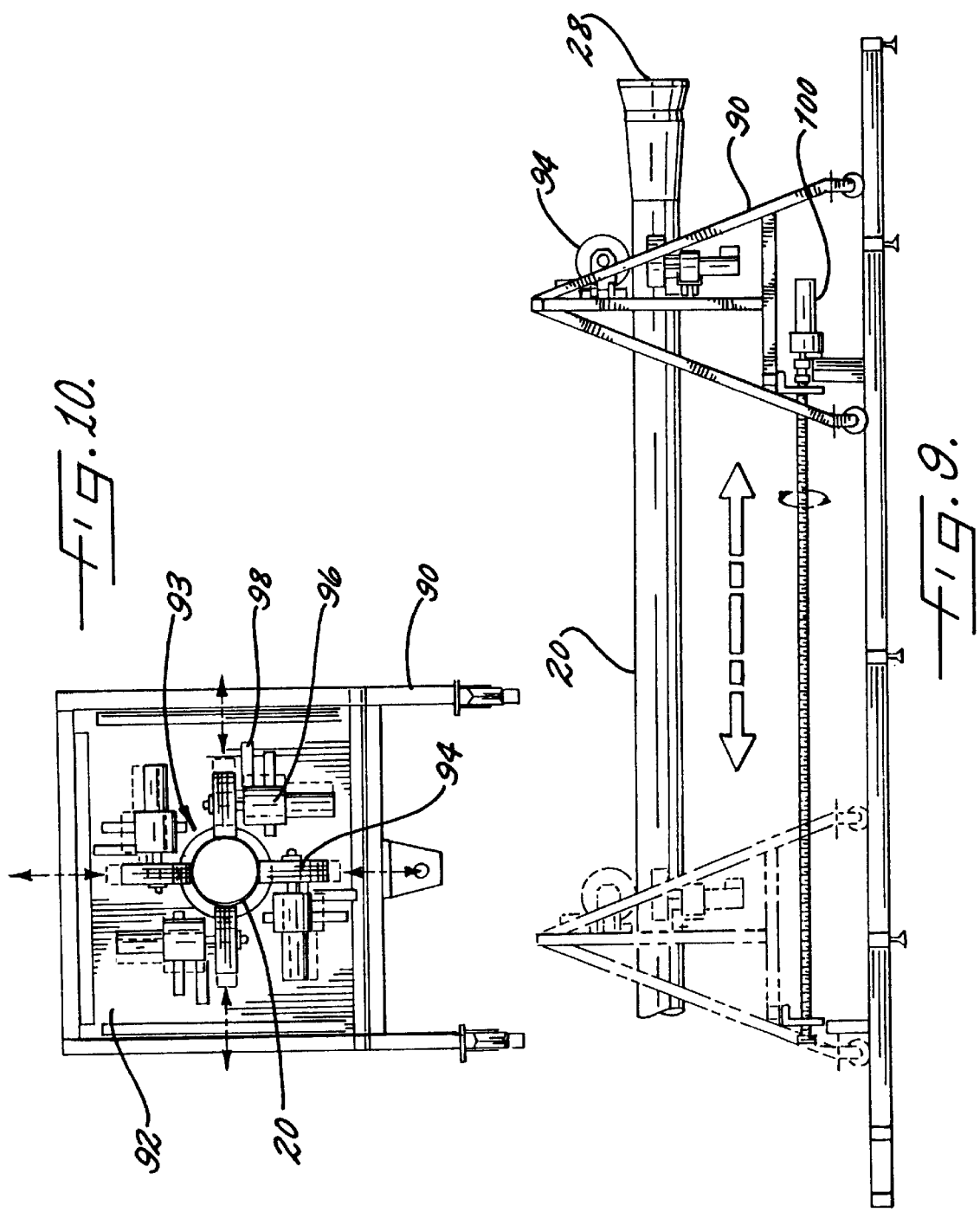

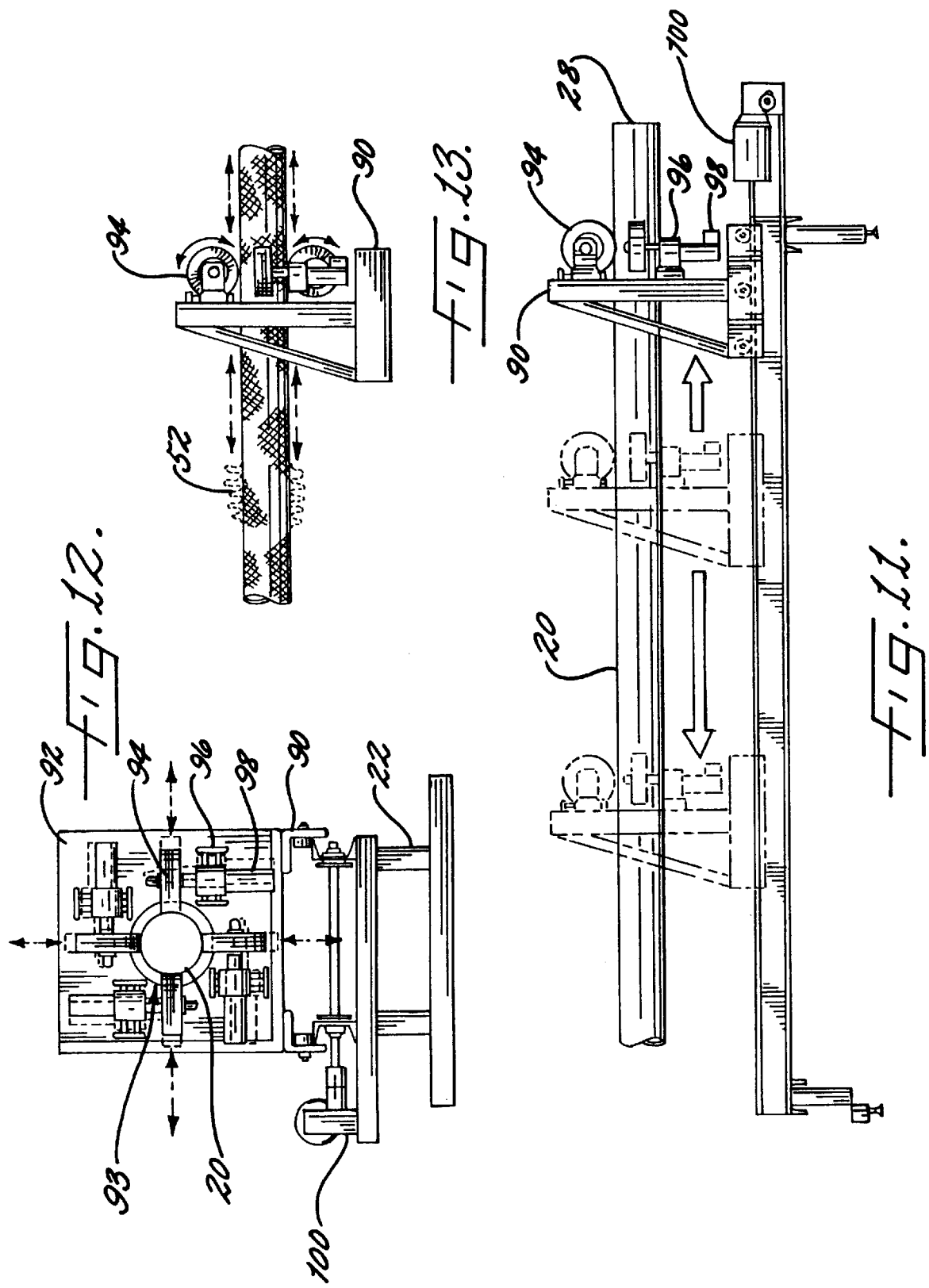

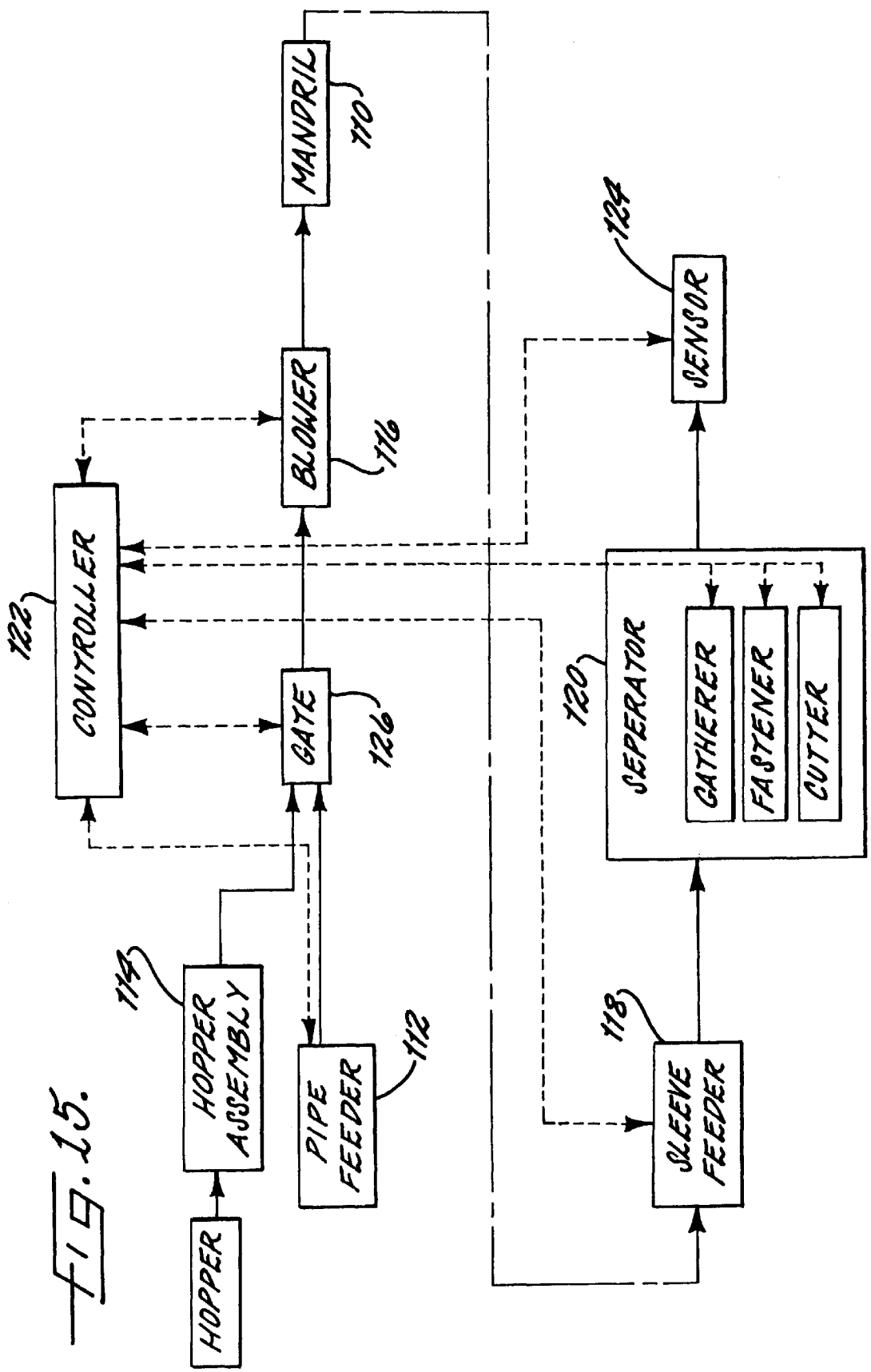

APPARATUS FOR MANUFACTURING DRAINAGE LINE UNITS AND ASSOCIATED METHODS

RELATED APPLICATIONS

This application is a continuation-in-part of copending provisional patent application Ser. No. 60/094,860, filed on Jul. 31, 1998, which is incorporated herein by reference in its entirety, the benefit of its earlier filing date being hereby claimed according to 37 C.F.R. §1.78(4).

FIELD OF THE INVENTION

The present invention relates to the field of drainage line units and, more particularly, to machines and methods for the manufacture thereof.

BACKGROUND OF THE INVENTION

Drainage line units have been available for a number of years. Various U.S. patents describe such units, as well as an apparatus for manufacturing the units, for example, machines for manufacturing drainage lines have been previously described in U.S. Pat. No. 5,154,543. Also, the drainage line units best suited for production by the apparatus of the present invention are as previously described in U.S. Pat. Nos. 5,015,123, 5,051,028, 5,154,543, 5,535,499 (the '499 patent ) and 5,657,527 (the '527 patent).

The previously disclosed and patented apparatus for fabricating the drainage line units, shown in the '527 and '499 patents, relied on machines using mechanical means to push an artificial aggregate material through a mandrel into a sleeve of netting to form the drainage units. The preferred artificial aggregate has been polystyrene or other poly-resinous material, however, as described in the '527 patent, these materials exhibit a high coefficient of friction, which makes it difficult to move this material through a conduit in a manufacturing operation. Mechanical means of pushing the aggregate included a hydraulically operated piston device and a screw drive auger, as shown in FIG. 15 of the '527 patent.

Experience with the manufacturing equipment shown in attached FIGS. 13, 14 and 15 of the '527 has shown that when using polystyrene and similar poly-resinous materials for the aggregate 21, the aggregate exhibits a high degree of surface friction when compacted by operation of the reciprocating hydraulic piston 101. To this end, it has been determined that the direction of compaction is not only longitudinally along the length of the mandrel 91, or conduit, but also that the nature of polystyrene and other poly-resinous materials is such as to expand outwardly into a high friction engagement with the inner surface of the conduit (mandrel 91). This problem occurs no only at the exit end of the mandrel 91, but also at intermediate points along its length, as is depicted in the cross-sectional side view of FIG. 18. In order to solve these problems, it was determined that the application of a low friction coating 250 along the inside surface of the mandrel 91, or conduit, substantially reduces the friction produced by the aggregate material inside the mandrel or conduit. Suitable low friction coatings include a silicone lubricant, or a deposited coating of a low friction polyresin such as nylon or Teflon® (a trademark of the DuPont Company). The use of the low friction coating dramatically increased the speed at which the hydraulic piston of the prior art could be reciprocated, thereby increasing the productivity of each manufacturing machine.

Rather than being directed at mitigating friction, the present invention overcomes the problem altogether through a new process, thereby resulting in much improved production rates and eliminating the need for lubricants or other means of mitigating friction between the poly-resinous material and the manufacturing equipment.

SUMMARY OF THE INVENTION

With the foregoing in mind, the present invention advantageously provides an apparatus for manufacturing a drainage line unit.

The present invention comprises transporting the poly-resinous aggregate material, such as polystyrene, through a conduit by creating a high velocity air flow within the conduit, thereby to pick up and transport the aggregate bodies through the conduit and within the air stream. The preferred aggregate is a light-weight material such as expanded polystyrene, other poly-resinous plastics, and any other light-weight materials suitable for crush protection in packaging and of an approximate size of ¾ to one inch bodies, an example of which is the plastic foam material popularly known as "packing peanuts".

The high-velocity air flow provides a number of advantages over mechanical conveyance means. A high-velocity air flow lifts and carries the aggregate bodies through the conduit without producing significant friction. Less friction means that less heat is generated during operations. While mechanical conveyance devices, such as the piston or auger drives previously described, tend to produce breakage of the aggregate bodies, such effect is minimized when the means of conveyance is an air flow, therefore more of the aggregate is usable for the manufacturing application. In addition, a high-velocity air flow is produced more efficiently than driving mechanical means, using less energy, and therefore results in a less expensive manufacturing operation.

The apparatus of the present invention includes a support frame, a mandrel preferably shaped in the form of a tube and horizontally positioned on the support. The mandrel has a tube wall which defines an inner cavity, and includes rear, upper and front openings which communicate with the cavity. A controller connects to at least one sensor positioned relative to a direction of manufacture so as to provide sensing information to the controller, the controller operably connected to control the apparatus responsively to the sensing information. A pipe feeder feeds a predetermined length of perforated vent pipe through the inner cavity of the mandrel in a direction of manufacture from the rear opening to the front opening and therethrough. The pipe extends into the inner cavity so as to define a void space between the pipe and the wall of the mandrel. A hopper assembly connects to the mandrel and has an exit port positioned in communication with the inner cavity for therethrough feeding a plurality of plastic bodies into the cavity. A blower connects in communication with the inner cavity of the mandrel for producing a sufficient air flow therethrough for moving the plurality of plastic bodies to substantially fill the void space so that the pipe emerges from the front opening of the mandrel surrounded by the plurality of plastic bodies. A sleeve feeder connects to the mandrel for feeding a continuous sleeve of netting over the plurality of plastic bodies and the vent pipe emerging through the front opening of the mandrel, thereby substantially encasing the plurality of plastic bodies around the vent pipe to form a drainage line. A separator connects in responsive communication with the controller, and is positioned relative to the direction of manufacture downstream from the sleeve feeder for fastening the continuous sleeve of netting to the vent pipe as the pipe emerges through the front opening of the mandrel, so as to substantially encase the plurality of plastic bodies around the vent pipe. Following the fastening operation, the separator cuts the continuous sleeve, thereby forming a drainage line unit.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 2 is a lateral elevation of the rear of the apparatus;

FIG. 3 shows detail of the gate;

FIG. 4 a lateral elevation of the blower in relation with the mandrel;

FIG. 9 illustrates a lateral elevation of one preferred embodiment of the sleeve feeder;

FIG. 10 shows a front elevation of the sleeve feeder;

FIG. 11 depicts a side elevation of a second embodiment of the sleeve feeder;

FIG. 12 is a front elevation of the second embodiment of the sleeve feeder;

FIG. 13 shows a side elevation of an embodiment of the sleeve feeder;

FIG. 15 is a block diagram illustrating the process and relationship of the parts of the apparatus.

DETAILED DESCRIPTION

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime notation, when used, indicates similar elements in alternative embodiments.

Figure 1:
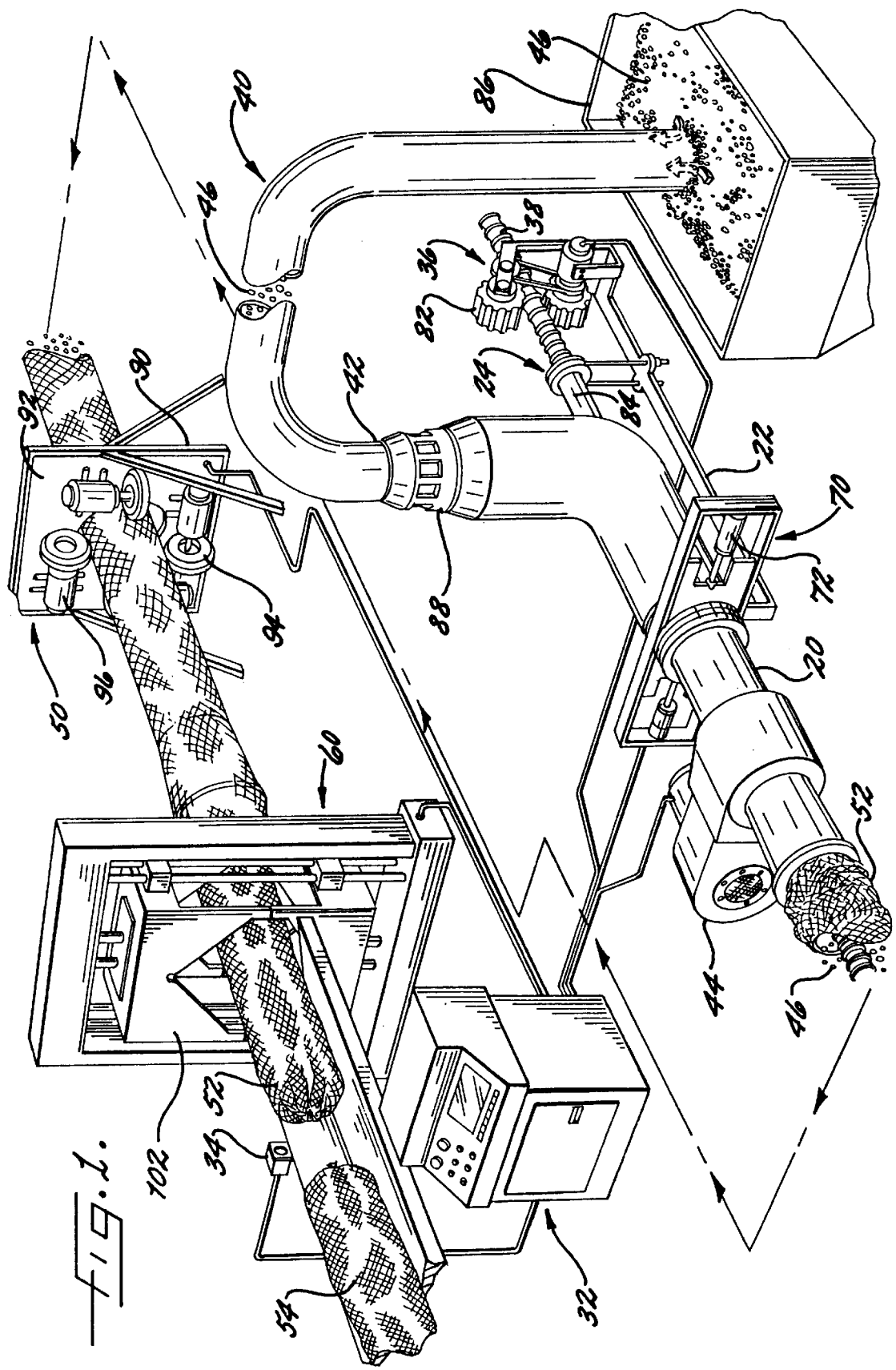
FIG. 1 provides a perspective view of the apparatus.
Figure 5:
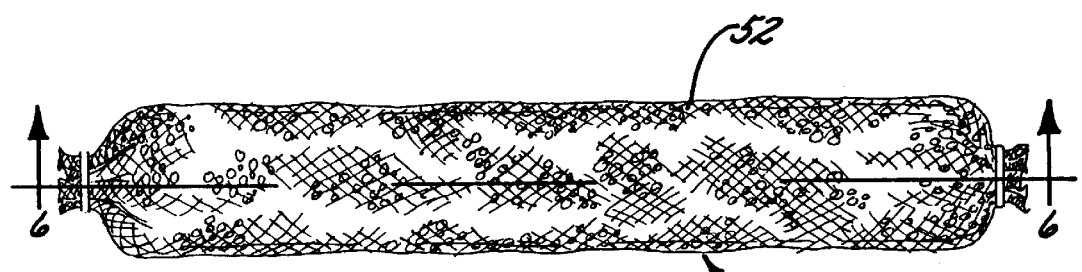
FIG. 5 is a lateral elevation of a drainage line unit.
Figure 6:
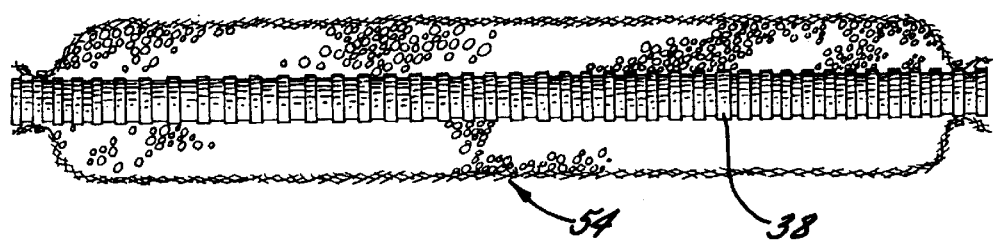
FIG. 6 is a schematic view of the drainage line unit showing the placement of the perforated pipe.

The apparatus of the present invention, best shown in FIG. 1, includes a mandrel 20 preferably shaped in the form of a tube, or barrel, which is horizontally positioned on a support 22, which may be a frame constructed of any suitable material and in any configuration, as known by those skilled in the art. The mandrel 20 has a tube wall defining an inner cavity 30, and includes a rear opening 24, an upper opening 26, and a front opening 28, each opening communicating with the cavity 30. Those skilled in the art will appreciate that the mandrel may take any form other than a tube, depending on the desired shape and dimension of the drainage lines being manufactured.

A controller 32 is preferably connected to at least one sensor 34 positioned relative to a direction of manufacture so as to provide sensing information to the controller 32. The controller 32 is operably connected to control the apparatus responsively to the sensing information. As known to those skilled in the art, the controller may be a control computer, such as a microprocessor.

A pipe feeder 36 is positioned for feeding a predetermined length of perforated vent pipe 38 through the inner cavity 30 of the mandrel 20 in a direction of manufacture from the rear opening 24 to the front opening 28 and therethrough. The pipe feeder 36 may feed discrete lengths of perforated vent pipe 38, or may preferably feed continuous pipe from a supply roll. As it is fed into the mandrel 20 the pipe 38 is positioned within the inner cavity 30 so as to define a void space between the pipe and the wall of the mandrel 20.

A hopper assembly 40, shown in FIG. 2, is connected to the mandrel 20 and has an exit port 42 positioned in communication with the inner cavity 30 of the mandrel 20 for therethrough feeding a plurality of plastic bodies 46 into the cavity. The plastic bodies form a lightweight aggregate material which will surround a perforated drainage pipe to form the drainage line unit. Those skilled in the art will understand that other lightweight aggregate materials may also be used for this purpose.

A blower 44 is positioned in communication with the inner cavity 30 of the mandrel 20, as best shown in FIG. 4, for producing a sufficient air flow therethrough for moving the plurality of plastic bodies 46 from the hopper assembly 40 through the cavity 30 to substantially fill the void space between the pipe and the wall of the mandrel 20, so that the pipe 38 is surrounded by the plastic bodies 46 as it emerges from the front opening 28 of the mandrel 20.

A sleeve feeder 50, illustrated in FIGS. 9 through 13, is also connected to the mandrel 20, for feeding a continuous sleeve of netting 52 over the plurality of plastic bodies 46 and the vent pipe 38 emerging through the front opening 28 of the mandrel. As it is fed, the continuous sleeve of netting 52 substantially encases the plurality of plastic bodies 46 around the vent pipe 38, thereby forming a drainage line 54.

A separator 60, shown in FIGS. 1 and 13, is additionally connected in responsive communication with the controller 32, and is positioned relative to the direction of manufacture downstream from the sleeve feeder 50. The separator 60 fastens the continuous sleeve of netting 52 to the vent pipe 38 as the pipe emerges through the front opening 28 of the mandrel, so as to substantially encase the plurality of plastic bodies 46 around the vent pipe. The separator 60 cuts the continuous sleeve after fastening, thereby forming a drainage line unit 62.

The mandrel 20 in a preferred embodiment includes a gate 70 responsive to the controller 32, best shown in FIG. 3. The gate 70 is positioned to close the inner cavity 30 relative to the direction of manufacture so as to substantially stop movement of the plurality of plastic bodies 46 therethrough, thereby providing a break in the manufacturing process to facilitate the fastening and cutting of the continuous sleeve of netting 52 by the separator. The gate 70 is preferably actuated by a fluid compression mechanism 72 responsive to the controller 32. The mandrel 20, in another preferred embodiment of the invention, may include interchangeable mandrels and interchangeable mandrel sections which are connectable to the mandrel 20 for allowing the manufacture of drainage line units 54 of various dimensions, or drainage line units 54 wherein the perforated vent pipe 38 is positioned offset from the center of the unit. For example, such offset units are manufactured by connecting an offset mandrel section onto the front opening 28 of the mandrel 20, to thereby guide the plurality of plastic bodies 46 to fill the continuous sleeve of netting 52 such as to unevenly surround the perforated pipe 38, thus producing a unit with the perforated pipe 38 offset from the center.

Figure 7:
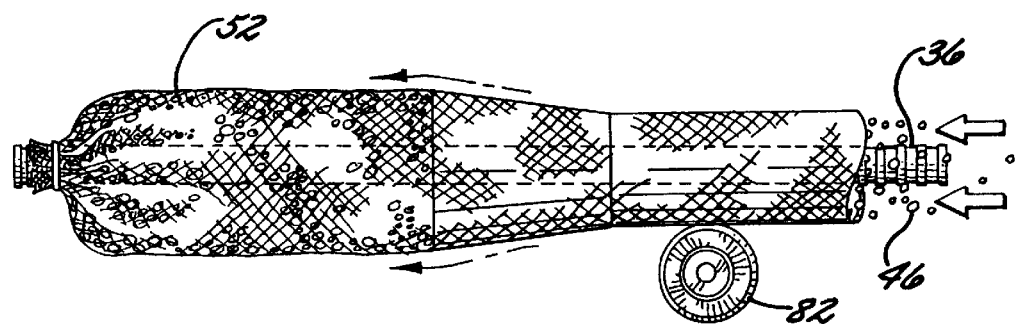
FIG. 7 is a schematic representation of the drainage line unit being formed at the front opening of the mandrel.
Figure 8:
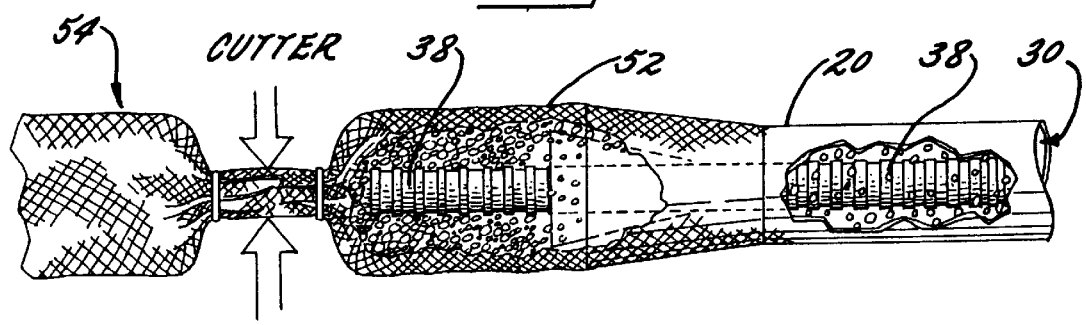
FIG. 8 is a schematic representation showing the sleeve of netting being fastened and cut to finish forming the drainage line unit.
Figure 14A:
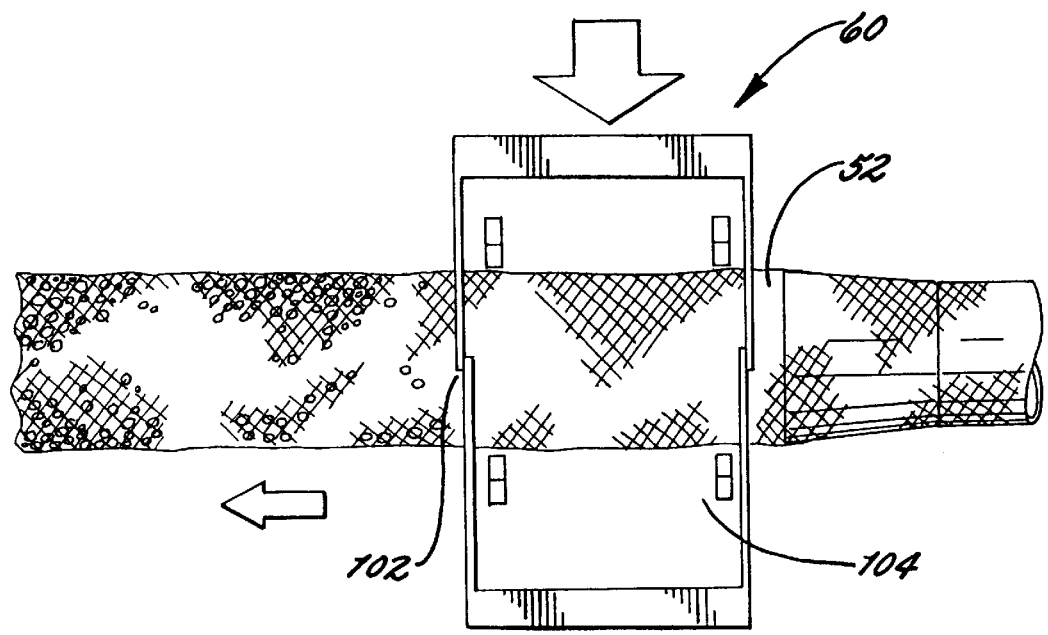
FIG. 14 is a schematic view of the separator as it fastens and cuts the end of a drainage line unit.
Figure 14B:
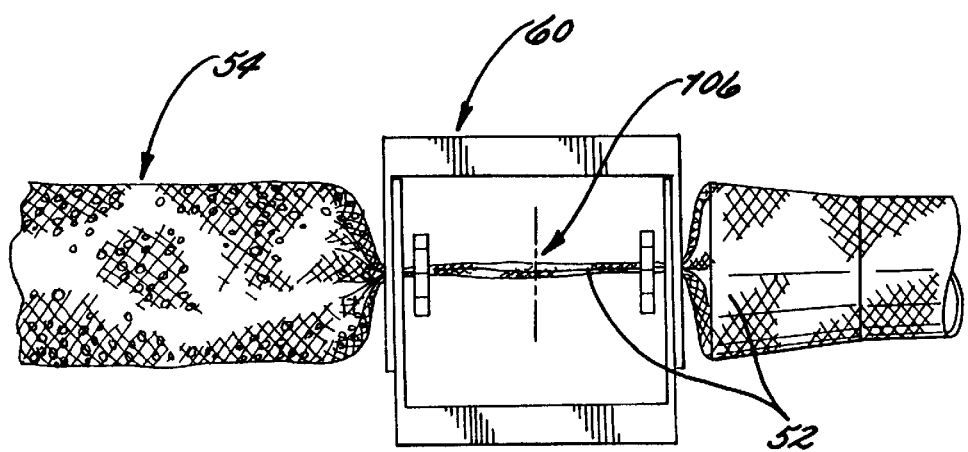

The apparatus preferably also includes a pipe feeder 36 having at least one drive roller 82 positioned to adjustably contact the perforated vent pipe 38 to thereby feed said pipe through the rear opening 24 of the mandrel into the inner cavity 30 and therethrough to emerge through the front opening 28 of the mandrel, as shown in FIGS. 1, 2, and 7. Additionally, the pipe feeder may be connected in communication with and responsive to the controller 32, to thereby adjust the pipe feeding for a predetermined manufacturing rate. In another preferred embodiment, the mandrel 20 includes a vent pipe guide tube 84 positioned within the inner cavity 30 connecting the rear opening 24 to the front opening 28, for feeding the perforated vent pipe through the guide tube so as to thereby allow predetermined positioning of the perforated vent pipe relative to the drainage line unit.

In another embodiment the gate 70 may be positioned within the hopper assembly 40, or anywhere along the path of the plastic bodies 46 so as to substantially stop their movement inside the mandrel 20, the gate being responsive to the controller 32. A gate placed essentially within the hopper assembly is preferably positioned to close relative to the exit port 42 of the hopper, so as to substantially stop the feeding of the plurality of plastic bodies 46, providing a temporary interruption in movement of the plurality of plastic bodies 46 through the cavity 30, thus creating a break in the flow of plastic bodies 46 and facilitating the fastening and cutting of the continuous sleeve of netting by the separator. In a preferred embodiment, the blower 44 for moving the plastic bodies 46 may be connected in responsive communication with the controller 32, the controller thereby controlling blower speed for adjusting the air flow to a predetermined manufacturing rate. Additionally, as illustrated in FIG. 1, the hopper assembly 40 further may preferably include a container 86 for holding a supply of the plurality of plastic bodies 46, and a connector 88 having air intake openings for allowing air to mix with the plurality of plastic bodies 46. The air intake openings may be preferably variably adjustable and responsive to the controller. The connector is positioned in fluid communication between the container and the cavity of the mandrel, to thereby help convey the plurality of plastic bodies 46 from the container toward the inner cavity.

The apparatus includes a sleeve feeder having a movable sleeve feeder frame 90 for slidably positioning the sleeve feeder 50 along the mandrel 20, as shown in FIGS. 9 and 11. A sleeve feeder body 92 is connected to the movable frame and has an opening 93 positioned therethrough for accepting the mandrel 20 extending through the opening, best seen in FIGS. 9 through 13. The sleeve feeder movable frame 90 includes a plurality of sleeve rollers 94 adjustably positioned on the sleeve feeder body 92, relative to the opening 93, so that each sleeve roller of the plurality makes contact with the mandrel 20 and exerts a predetermined pressure thereon. The sleeve feeder 50 rolls a continuous sleeve of netting 52 over the mandrel 20 by receiving the sleeve between the plurality of rollers 94 and the mandrel 20 and rolling the sleeve onto the mandrel 20, accumulating an amount of sleeve on the mandrel 20 to serve as a supply of continuous sleeve for subsequent use in manufacturing the drainage line unit 62. Each roller of the plurality is preferably reversibly driven by a sleeve feeder roller motor 96 and is adjustably positioned by at least one fluid compression actuator 98 responsive to the controller 32, for controllably feeding the continuous sleeve 52. The sleeve feeder movable frame 90 may be connected to a frame motor 100 for controllably positioning the sleeve feeder at a predetermined position relative to the mandrel 20. The movable frame motor may be connected to the movable frame as known to those skilled in the art, for example, by a screw gear, a chain, or a rack and pinion mechanism. The controller 32 may be further connected to at least one sensor 34 positioned relative to the direction of manufacture downstream from the sleeve feeder 50 for sensing when a predetermined length of drainage line 54 has been formed so as to thereby provide sensing information to the controller, the controller preferably being operably connected to control the operation of the apparatus responsive to said sensing information.

The apparatus in one preferred embodiment is configured so that the separator 60 includes a gatherer 102 for gathering the continuous sleeve of netting into a small bundle at a predetermined point along the drainage line, a sleeve fastener 104 for fastening the sleeve closed after gathering, and a cutter 106 for cutting the continuous sleeve after fastening. The gatherer 102 preferably has a jaw mechanism which is actuated by fluid compression for gathering the sleeve of netting into a small bundle to thereby facilitate fastening. The sleeve fastener 104 includes a clamp applicator for applying at least one clamp to the continuous sleeve after the sleeve has been gathered, to thereby substantially close the sleeve. The cutter 106 preferably takes the form of a heated knife, as known to those skilled in the art, for cutting the continuous sleeve following gathering and fastening. The separator 60 preferably is actuated by a fluid compression device operably connected to the controller, to thereby provide operational control of manufacturing. In a preferred mode of manufacturing the separator simultaneously fastens and cuts a rear end of a first drainage line unit and a front end of a second drainage line unit as the drainage line units move in the direction of manufacture, as shown in FIG. 13.

As illustrated in FIGS. 1 through 15, the steps being particularly shown schematically in a block diagram in FIG. 15, the present invention also includes a method for manufacturing a drainage line unit. The method includes a first step of positioning a mandrel 110 horizontally on a support, the mandrel having a wall defining an inner cavity, and including rear, upper and front openings communicating with the cavity. A second step requires feeding a perforated vent pipe from a pipe feeder 112 positioned for feeding the pipe through the inner cavity of the mandrel in a direction of manufacture from the rear opening to the front opening and therethrough, to thereby position the pipe so as to define a void space within the inner cavity between the pipe and the wall of the mandrel. A third step of feeding a plurality of plastic bodies 114 into the inner cavity of the mandrel from a hopper assembly connected to the mandrel, the hopper containing a supply of the plurality of plastic bodies and having an exit port positioned in communication with the cavity for therethrough feeding the plastic bodies. A fourth step of operating a blower 116 positioned in communication with the inner cavity of the mandrel thereby producing a sufficient air flow through the cavity for moving the plurality of plastic bodies to substantially fill the void space so that the pipe emerges from the front opening of the mandrel surrounded by the plurality of plastic bodies. A fifth step of feeding a continuous sleeve of netting 118 from a sleeve feeder connected to the mandrel so as to encase within the sleeve the plurality of plastic bodies and the vent pipe emerging through the front opening of the mandrel, thereby forming a drainage line. And, lastly, a sixth step of forming a drainage line unit is accomplished by activating a separator 120 responsively in communication with the controller 122, the separator positioned relative to the direction of manufacture downstream from the sleeve feeder to thereby fasten the continuous sleeve of netting to the vent pipe as the pipe emerges through the front opening of the mandrel, so as to substantially encase the plurality of plastic bodies around the vent pipe, and to cut the continuous sleeve after fastening. The method may preferably include the step of connecting a controller to at least one sensor 124 positioned relative to a direction of manufacture for the sensor to provide sensing information to the controller, and operably connecting the controller for controlling the apparatus responsively to the sensing information. Additionally, the method may preferably also include positioning a gate 126 responsive to the controller in the mandrel such as to close and substantially interrupt the movement of the plastic bodies through the mandrel, to thereby facilitate the fastening and cutting of the drainage line by the separator.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. An apparatus for manufacturing a drainage line unit, the apparatus comprising:

a) a mandrel having a wall defining an inner cavity, and including rear, upper and front openings communicating with said cavity;

b) a pipe feeder positioned for feeding a predetermined length of perforated vent pipe through the inner cavity in a direction of manufacture from said rear opening to said front opening and therethrough, the pipe being positioned within the inner cavity so as to define a void space between the pipe and the wall;

c) a hopper assembly connected to the mandrel, having an exit port positioned in communication with the inner cavity for therethrough feeding a plurality of plastic bodies into said cavity; and d) a blower positioned in communication with the inner cavity for producing a sufficient air flow therethrough for moving the plurality of plastic bodies to substantially fill said void space so that the pipe emerges from the front opening of the mandrel surrounded by the plurality of plastic bodies.

2. The apparatus of claim 1, further comprising interchangeable mandrels and mandrel sections for allowing the manufacture of drainage line units of various dimensions.

3. The apparatus of claim 1, wherein the pipe feeder further includes at least one drive roller positioned to adjustably contact the perforated vent pipe to thereby feed said pipe through the rear opening of the mandrel into the inner cavity and therethrough to emerge through the front opening of the mandrel.

4. The apparatus of claim 1, wherein the mandrel further comprises a vent pipe guide tube positioned within the inner cavity of the mandrel connecting said rear opening to said front opening, for feeding said perforated vent pipe through the vent pipe guide tube so as to thereby allow predetermined positioning of the perforated vent pipe relative to the drainage line unit.

5. The apparatus of claim 1, wherein the hopper assembly further comprises a container for holding a supply of the plurality of plastic bodies, and a connector having air intake openings for allowing air to mix with the plurality of plastic bodies, the connector positioned in fluid communication between the container and the inner cavity of the mandrel, to thereby allow passage of the plurality of plastic bodies from the container toward the inner cavity of the mandrel.

6. The apparatus of claim 1, further including a controller connected to at least one sensor positioned relative to a direction of manufacture so as to provide sensing information to the controller, the controller being operably connected to control the operation of the apparatus responsively to said sensing information.

7. The apparatus of claim 6, wherein the mandrel further includes a gate responsive to said controller and positioned to close said inner cavity relative to the direction of manufacture so as to substantially stop movement of the plurality of plastic bodies therethrough.

8. The apparatus of claim 7, wherein the gate is actuated by a fluid compression mechanism responsive to the controller.

9. The apparatus of claim 6, wherein the pipe feeder is in communication with and responsive to the controller, to thereby adjust the pipe feeding for a predetermined manufacturing rate.

10. The apparatus of claim 6, wherein the hopper assembly further includes a gate responsive to said controller, the gate positioned to close relative to the exit port so as to substantially stop the feeding of the plurality of plastic bodies, to thereby provide a temporary interruption in movement of the plurality of plastic bodies.

11. The apparatus of claim 6, wherein the blower is connected in responsive communication with the controller, for the controller to thereby control blower speed for adjusting the air flow to a predetermined manufacturing rate.

12. The apparatus of claim 1, further including a sleeve feeder connected to the mandrel for feeding a continuous sleeve of netting over the plurality of plastic bodies and the vent pipe emerging through the front opening of the mandrel, said continuous sleeve of netting for substantially encasing the plurality of plastic bodies around the vent pipe, to thereby form a drainage line.

13. The apparatus of claim 12, further comprising a controller connected to at least one sensor positioned relative to the direction of manufacture downstream from the sleeve feeder for sensing when a predetermined length of drainage line has been formed so as to thereby provide sensing information to the controller, the controller being operably connected to control the operation of the apparatus responsive to said sensing information.

14. The apparatus of claim 12, further comprising a movable sleeve feeder frame for slidably positioning the sleeve feeder along the mandrel, and a sleeve feeder body connected to said frame and having an opening therethrough, the mandrel extending through said opening, the sleeve feeder further including a plurality of sleeve rollers adjustably positioned on said body relative to the opening so that each sleeve roller of the plurality makes contact with the mandrel and exerts a predetermined pressure thereon.

15. The apparatus of claim 14, further including a motor driven gear connected to said movable frame for controllably positioning the sleeve feeder at a predetermined position relative to the mandrel.

16. The apparatus of claim 14, further including a length of a continuous sleeve of netting positioned to therein receive the mandrel by said sleeve being positioned between the plurality of rollers and the mandrel and being rolled onto the mandrel by the plurality of rollers, so as to provide a supply of continuous sleeve rolled onto the mandrel for subsequent use in manufacturing the drainage line unit.

17. The apparatus of claim 16, wherein each roller of said plurality is reversibly driven by an electric motor and is adjustably positioned by at least one fluid compression actuator responsive to a controller, for controllably feeding the continuous sleeve.

18. The apparatus of claim 12, further including a separator positioned relative to the direction of manufacture downstream from the sleeve feeder for fastening the continuous-sleeve of netting to the vent pipe as said pipe emerges through the front opening of the mandrel, so as to substantially encase the plurality of plastic bodies around the vent pipe, and for cutting the drainage line after fastening, thereby forming a completed drainage line unit.

19. The apparatus of claim 18, wherein the separator further comprises a gatherer for gathering the continuous sleeve of netting into a bundle at a predetermined point along the drainage line, a sleeve fastener for fastening the sleeve closed after gathering, and a cutter for cutting the drainage line unit after sleeve fastening.

20. The apparatus of claim 19, wherein the gatherer comprises a jaw actuated by fluid compression for gathering the sleeve of netting into a bundle to thereby facilitate fastening.

21. The apparatus of claim 19, wherein the sleeve fastener comprises a clamp applicator for applying at least one clamp to the continuous sleeve, to thereby substantially close the sleeve.

22. The apparatus of claim 19, wherein the cutter comprises a heated knife for cutting the drainage line unit.

23. The apparatus of claim 19, wherein the separator is actuated by a fluid compression device operably connected to a controller.

24. The apparatus of claim 19, wherein the separator simultaneously fastens and cuts a rear end of a first drainage line unit and a front end of a second drainage line unit as said drainage line units move in a direction of manufacture.

25. A method for manufacturing a drainage line unit, the method including the steps of:
   a) providing a mandrel having a wall defining an inner cavity, and including rear, upper and front openings communicating with said cavity;
   b) feeding a perforated vent pipe from a pipe feeder positioned for feeding the pipe through the inner cavity of the mandrel in a direction of manufacture from said rear opening to said front opening and therethrough, to thereby position the pipe so as to define a void space within said inner cavity between the pipe and the wall of the mandrel;
   c) feeding a plurality of plastic bodies into the inner cavity of the mandrel from a hopper assembly connected to the mandrel, said hopper containing the plurality of plastic bodies and having an exit port positioned in communication with said cavity for therethrough feeding the plurality of plastic bodies; and
   d) operating a blower positioned in communication with the inner cavity of the mandrel thereby producing a sufficient air flow through said cavity for moving the plurality of plastic bodies to substantially fill said void space so that the pipe emerges from the front opening of the mandrel surrounded by the plurality of plastic bodies.

26. The method of claim 25, further including the step of providing interchangeable mandrels and mandrel sections for the apparatus, thereby allowing the manufacture of drainage line units of various dimensions.

27. The method of claim 25, further including the step of providing the pipe feeder with at least one drive roller positioned to adjustably contact the perforated vent pipe to thereby feed said pipe through the rear opening of the mandrel into the inner cavity and therethrough to emerge through the front opening of the mandrel.

28. The method of claim 25, further including the steps of connecting a controller to at least one sensor positioned relative to the direction of manufacture downstream from the sleeve feeder for sensing when a predetermined length of drainage line has been formed so as to thereby provide sensing information to the controller, and controlling the operation of the apparatus responsively to said sensing information by operably connecting the controller therefor.

29. The method of claim 25, further comprising the steps of positioning a vent pipe guide tube within the inner cavity of the mandrel connecting said rear opening to said front opening, and feeding said perforated vent pipe through the vent pipe guide tube so as to thereby allow predetermined positioning of the perforated vent pipe relative to the drainage line unit.

30. The method of claim 25, wherein said hopper assembly is connected in fluid communication with a container for holding a supply of the plurality of plastic bodies, and includes a connector having air intake openings for allowing air to mix with the plurality of plastic bodies, the connector positioned in fluid communication relative to the container and the inner cavity of the mandrel, thereby allowing passage for the plurality of plastic bodies from the container toward the inner cavity of the mandrel.

31. The method of claim 25, wherein the step of forming a drainage line unit further comprises gathering the continuous sleeve of netting into a bundle at a predetermined point along the drainage line, subsequently fastening the sleeve closed, and cutting the drainage line unit after sleeve fastening.

32. The method of claim 31, further including the step of applying at least one clamp to the continuous sleeve, to thereby substantially close the sleeve.

33. The method of claim 31, further including the step of cutting the drainage line unit with a heated blade.

34. The method of claim 31, further including the step of actuating the separator by a fluid compression device operably connected to a controller.

35. The method of claim 31, further including the step of sequentially fastening and cutting a rear end of a first drainage line unit and a front end of a second drainage line unit as said drainage line units move in a direction of manufacture.

36. The method of claim 25, further including the step of connecting a controller to at least one sensor positioned relative to a direction of manufacture for the sensor to provide sensing information to the controller, and operably connecting the controller for controlling the apparatus responsively to said sensing information.

37. The method of claim 36, further including the step of operating a gate responsively to said controller and positioned to close said cavity relative to the direction of manufacture so as to substantially stop movement of the plurality of plastic bodies therein.

38. The method of claim 37, further including the step of actuating the gate by a fluid compression mechanism responsive to the controller.

39. The method of claim 36, further including the step of connecting the pipe feeder to communicate with and be responsive to the controller, for the controller to thereby adjust the pipe feeding for a predetermined manufacturing rate.

40. The method of claim 36, further including the step of positioning a gate responsive to said controller to close relative to the exit port of said hopper assembly so as to substantially stop the feeding of the plurality of plastic bodies, to thereby provide a temporary interruption in movement of the plurality of plastic bodies.

41. The method of claim 36, further including the step of connecting the blower in responsive communication with the controller, for the controller to thereby control blower speed for adjusting the air flow to a predetermined manufacturing rate.

42. The method of claim 25, further including the step of feeding a continuous sleeve of netting from a sleeve feeder connected to the mandrel so as to encase within the sleeve the plurality of plastic bodies and the vent pipe emerging through the front opening of the mandrel, thereby forming a drainage line.

43. The method of claim 42, further including the step of forming a drainage line unit by activating a separator responsively in communication with a controller, the separator positioned relative to the direction of manufacture downstream from the sleeve feeder for fastening the continuous sleeve of netting to the vent pipe as said pipe emerges through the front opening of the mandrel so as to substantially encase the plurality of plastic bodies around the vent pipe, and to cut the drainage line after fastening.

44. The method of claim 42, wherein the step of feeding the continuous sleeve of netting further includes positioning the sleeve feeder on a movable frame for slidably positioning the sleeve feeder along the mandrel, providing the sleeve feeder with body connected to said frame and having an opening therethrough, the mandrel extending through said opening, and adjustably positioning a plurality of sleeve rollers on said body relative to the opening so that each sleeve roller of the plurality makes contact with the mandrel and exerts a predetermined pressure thereon.

45. The method of claim 44, further including the step of connecting the movable frame to a motor driven gear, thereby controllably positioning the sleeve feeder at a predetermined position relative to the mandrel.

46. The method of claim 44, further including the step of positioning a length of a continuous sleeve of netting to therein receive the mandrel by positioning said sleeve between the plurality of rollers and the mandrel and having the plurality of rollers roll the sleeve onto the mandrel so as to provide a supply of continuous sleeve rolled onto the mandrel for subsequent use in manufacturing the drainage line unit.

47. The method of claim 46, wherein the step of positioning a length of continuous sleeve of netting over the mandrel further includes connecting each roller of said plurality so as to be reversibly driven by an electric motor and adjustably positioned by at least one fluid compression actuator responsive to a controller, for controllably feeding the continuous sleeve.

48. A machine for manufacturing a drainage line unit, comprising:

a) a controller connected to the machine and having at least a plurality of sensors positioned relative to a direction of manufacture so as to provide sensing information to the controller, the controller being operably connected to control the operation of the machine responsively to said sensing information;

b) a mandrel having a wall defining a mandrel cavity, said mandrel including rear, upper and front openings communicating with said cavity, said mandrel further including a gate actuated by fluid compression and responsive to said controller, the gate for substantially closing passage through the cavity;

c) a pipe feeder responsively connected to the controller and having a plurality of drive rollers adjustably positioned for feeding a predetermined length of perforated vent pipe through the cavity in a direction of manufacture from said rear opening to said front opening and therethrough, the pipe being positioned within the inner cavity so as to define a void space between the pipe and the wall;

d) a vent pipe guide tube positioned within the inner cavity of the mandrel connecting said rear opening to said front opening, for feeding said perforated vent pipe through the vent pipe guide tube so as to thereby allow predetermined positioning of the perforated vent pipe relative to the drainage line unit;

e) a hopper assembly connected to the mandrel, having an exit port positioned in communication with the inner cavity for therethrough feeding a plurality of plastic bodies into said cavity;

f) a blower responsively connected to the controller and positioned in communication with the inner cavity for producing a sufficient air flow therethrough for moving the plurality of plastic bodies to substantially fill said void space so that the pipe emerges from the front opening of the mandrel surrounded by the plurality of plastic bodies;

g) a sleeve feeder responsively connected to the controller and having a movable frame for slidably positioning the sleeve feeder at a predetermined position along the mandrel, and a sleeve feeder body connected to said frame and having an opening therethrough, the mandrel extending through said opening such that the sleeve feeder is thereby slidably mounted on the mandrel, the sleeve feeder further including a plurality of reversibly driven sleeve rollers adjustably positioned on said body relative to the opening so that each sleeve roller of the plurality makes contact with the mandrel and exerts a predetermined pressure thereon, for feeding a continuous sleeve of netting over the plurality of plastic bodies and the vent pipe emerging through the front opening of the mandrel, said continuous sleeve of netting for substantially encasing the plurality of plastic bodies around the vent pipe, to thereby form a drainage line;

h) a separator responsively connected to the controller, positioned relative to the direction of manufacture downstream from the sleeve feeder, having a jaw actuated by fluid compression for gathering the sleeve of netting, a clamp applicator for applying at least one clamp to the gathered sleeve, and a hot knife for cutting the clamped sleeve, thereby forming a drainage line unit.

* * * * *